US007036027B2

(12) United States Patent
Kim et al.

(10) Patent No.: US 7,036,027 B2
(45) Date of Patent: Apr. 25, 2006

(54) COMPUTER SYSTEM LAYOUT AND COOLING CONFIGURATION

(75) Inventors: David K. Kim, San Jose, CA (US); William W. Ruckman, San Jose, CA (US); Anthony Kozaczuk, Burlingame, CA (US); Wenjun Chen, Fremont, CA (US); Talal J. Ahwal, Santa Cruz, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 80 days.

(21) Appl. No.: 10/274,824

(22) Filed: Oct. 21, 2002

(65) Prior Publication Data

US 2004/0075981 A1    Apr. 22, 2004

(51) Int. Cl.
*G06F 1/20* (2006.01)

(52) U.S. Cl. .................. 713/300; 713/322; 361/687

(58) Field of Classification Search ........ 361/683–697, 361/724–727; 312/236, 223.1; 165/80.3, 165/80.4, 120–126, 80.2, 104.33; 415/177, 415/178, 213.1, 214.1; 713/300
See application file for complete search history.

(56) References Cited

U.S. PATENT DOCUMENTS

| | | | | |
|---|---|---|---|---|
| 5,121,291 A | * | 6/1992 | Cope et al. | 361/695 |
| 5,796,580 A | * | 8/1998 | Komatsu et al. | 361/687 |
| 6,134,667 A | * | 10/2000 | Suzuki et al. | 713/300 |
| 6,181,556 B1 | * | 1/2001 | Allman | 361/690 |
| 6,191,546 B1 | * | 2/2001 | Bausch et al. | 318/471 |
| 6,491,426 B1 | * | 12/2002 | Schonath et al. | 374/45 |
| 6,532,151 B1 | * | 3/2003 | Osecky et al. | 361/687 |
| 6,792,550 B1 | * | 9/2004 | Osecky et al. | 361/695 |
| 6,798,659 B1 | * | 9/2004 | Chen | 361/697 |
| 6,856,139 B1 | * | 2/2005 | Rijken et al. | 165/80.2 |

* cited by examiner

*Primary Examiner*—Lisa Lea-Edmonds
(74) *Attorney, Agent, or Firm*—Blakely, Sokoloff, Taylor & Zafman LLP (57) ABSTRACT

Disclosed are novel methods and apparatus for provision of efficient, effective, and/or flexible computer system layout and/or cooling configuration. In accordance with an embodiment of the present invention, a method of cooling a computer system is disclosed. The computer system may include a plurality of heat generating electrical components that require cooling. The method includes: providing at least two cooling fans arranged front to back of the computer system to create a push (inlet) and pull (outlet) airflow to cool the computer system and providing a plurality of temperature sensors located at various locations within the computer system to sense a local temperature.

25 Claims, 6 Drawing Sheets

COMPUTER SYSTEM LAYOUT AND COOLING CONFIGURATION

FIELD OF INVENTION

The present invention generally relates to the field of computer system layout. More specifically, an embodiment of the present invention relates to layout and cooling configurations for multiprocessor computer systems.

BACKGROUND OF INVENTION

As integrated circuit fabrication technology improves, manufacturers are able to integrate additional functionality onto a single silicon substrate. As the number of these functionalities increases, however, so does the number of components on a single chip. Additional components add additional signal switching, in turn, creating more heat. The additional heat may damage a chip by, for example, thermal expansion. Also, the additional heat may limit the locations where a computer system may be installed. For example, if a computer is to be used in the same vicinity as a computer user (e.g., a desktop computer), industry standard environmental controls such as those used in data centers (sometimes costing millions of dollars) are impractical.

Accordingly, heat dissipation is one of the most important challenges facing the computer industry today in light of the growing need for computer speed and functionality. It is expected that within a few years, processors may be consuming more than 1,000 Watts of power. In response, numerous techniques are currently utilized by computer manufacturers to reduce the affects of this problem.

One common way to flush out heat is through utilization of fans in conjunction with heat sinks. Heat sinks are generally pieces of metallic material that pull the generated heat away from a chip. The fans then direct the extracted heat outside of the computer system. As the heat generated increases, however, so do the costs associated with providing an adequate heat sink. Another solution is liquid cooling which can be extremely expensive and is generally reserved for very expensive computer systems (such as super computers).

Other techniques include utilizing software procedures to improve parallelism and slowing down a chip's clock speed. Transmeta Corporation of Santa Clara, Calif., utilizes a software-based approach by replacing transistors with software instead of slowing down a processor. These techniques, however, add overhead for the software procedures invoked and are generally less desirable because of the potential complexity involved.

SUMMARY OF INVENTION

The present invention, which may be implemented in a general-purpose digital computer, in certain embodiments, includes novel methods and apparatus to provide efficient, effective, and/or flexible computer system layout and/or cooling configuration. In accordance with an embodiment of the present invention, a method of cooling a computer system is disclosed. The computer system may include a plurality of heat generating electrical components that require cooling. The method includes: providing at least two cooling fans arranged front to back of the computer system to create a push (inlet) and pull (outlet) airflow to cool the computer system and providing a plurality of temperature sensors located at various locations within the computer system to sense a local temperature.

In another embodiment of the present invention, the method includes providing a central processing unit (CPU) fan coupled to a CPU to extract heat generated by the CPU.

In a further embodiment of the present invention, the plurality of temperature sensors are utilized to control speeds of one or more of the inlet fan, outlet fan, or the CPU fan.

In yet another embodiment of the present invention, the method may further include increasing the speed of one or more of the inlet fan, outlet fan, and the CPU fan when a temperature sensed by one or more of the plurality of temperature sensors increases.

In a different embodiment of the present invention, the method may further include decreasing the speed of one or more of the inlet fan, outlet fan, and the CPU fan when a temperature sensed by one or more of the plurality of temperature sensors decreases.

BRIEF DESCRIPTION OF DRAWINGS

The present invention may be better understood and its numerous objects, features, and advantages made apparent to those skilled in the art by reference to the accompanying drawings in which.

The use of the same reference symbols in different drawings indicates similar or identical items.

DETAILED DESCRIPTION

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment.

Figure 1:
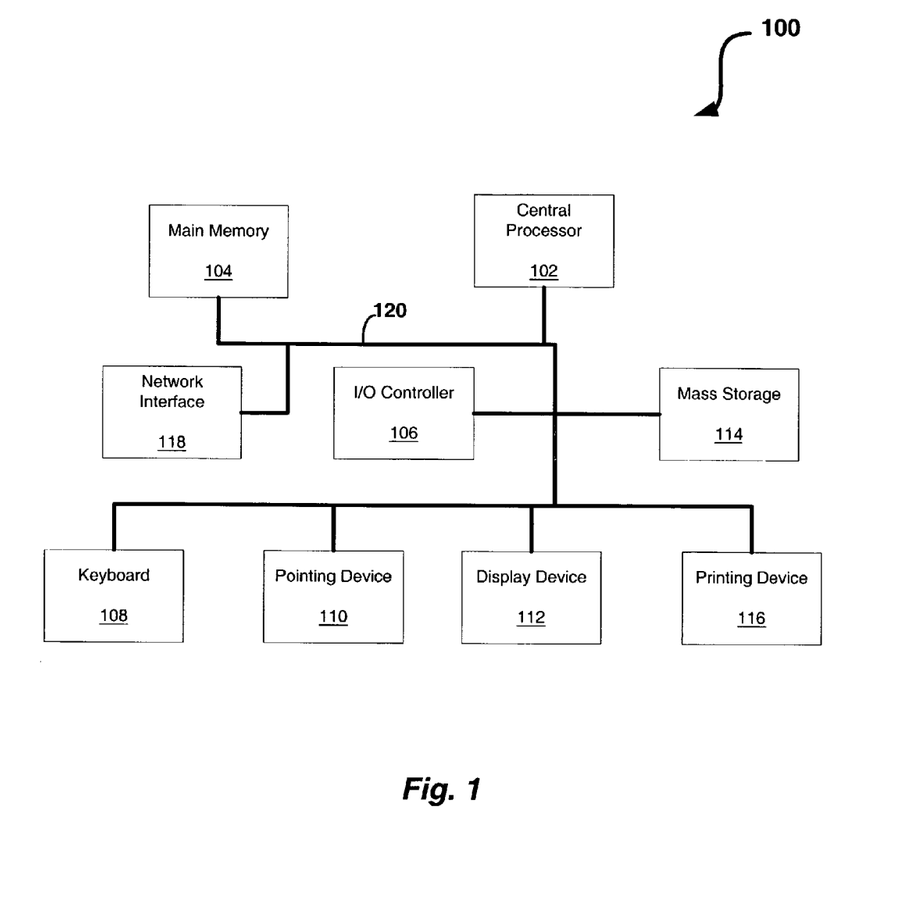
FIG. 1 illustrates an exemplary computer system 100 in which certain embodiments of the present invention may be implemented.

FIG. 1 illustrates an exemplary computer system 100 in which certain embodiments of the present invention may be implemented. The system 100 comprises a central processor 102 (or central processing unit (CPU)), a main memory 104, an input/output (I/O) controller 106, a keyboard 108, a pointing device 110 (e.g., mouse, track ball, pen device, or the like), a display device 112, a mass storage 114 (e.g., a nonvolatile storage such as a hard disk, an optical drive, and the like), and a network interface 118. Additional input/ output devices, such as a printing device 116, may be included in the system 100 as desired. As illustrated, the various components of the system 100 communicate through a system bus 120 or similar architecture.

In accordance with an embodiment of the present invention, the computer system 100 includes a Sun Microsystems computer utilizing a SPARC microprocessor available from several vendors (including Sun Microsystems, Inc., of Santa Clara, Calif.). Those with ordinary skill in the art understand, however, that any type of computer system may be utilized to embody the present invention, including those made by Hewlett Packard of Palo Alto, Calif., and IBM-compatible personal computers utilizing Intel microprocessor, which are available from several vendors (including IBM of Armonk, N.Y.). Also, instead of a single processor, two or more processors (whether on a single chip or on separate chips) can be utilized to provide speedup in operations. It is further envisioned that the processor 102 may be a complex instruction set computer (CISC) microprocessor, a reduced instruction set computing (RISC) microprocessor, a very long instruction word (VLIW) microprocessor, a processor implementing a combination of instruction sets, and the like.

The network interface 118 provides communication capability with other computer systems on a same local network, on a different network connected via modems and the like to the present network, or to other computers across the Internet. In various embodiments of the present invention, the network interface 118 can be implemented utilizing technologies including, but not limited to, Ethernet, Fast Ethernet, wide-area network (WAN), leased line (such as T1, T3, optical carrier 3 (OC3), and the like), analog modem, digital subscriber line (DSL and its varieties such as high bit-rate DSL (HDSL), integrated services digital network DSL (IDSL), and the like), cellular, time division multiplexing (TDM), universal serial bus (USB and its varieties such as USB II), asynchronous transfer mode (ATM), satellite, cable modem, and/or FireWire.

Moreover, the computer system 100 may utilize operating systems such as Solaris, Windows (and its varieties such as CE, NT, 2000, XP, ME, and the like), HP-UX, IBM-AIX, PALM, UNIX, Berkeley software distribution (BSD) UNIX, Linux, Apple UNIX (AUX), Macintosh operating system (Mac OS) (including Mac OS X), and the like. Also, it is envisioned that in certain embodiments of the present invention, the computer system 100 is a general purpose computer capable of running any number of applications such as those available from companies including Oracle, Siebel, Unisys, Microsoft, and the like.

Figure 2:
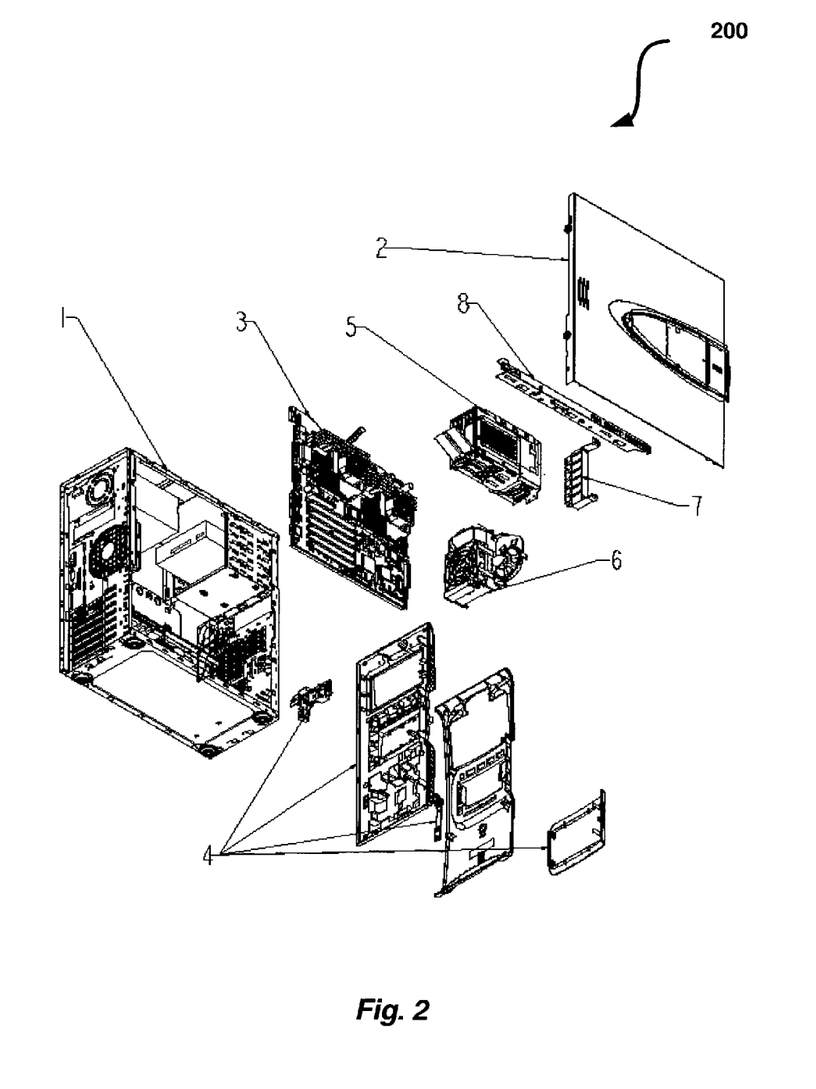
FIG. 2 illustrates an exemplary partial exploded view of a computer system 200 in accordance with an embodiment of the present invention.

FIG. 2 illustrates an exemplary partial exploded view of a computer system 200 in accordance with an embodiment of the present invention. In an embodiment of the present invention, the computer system 200 may include the same or similar elements discussed with respect to the computer system 100 of FIG. 1. The computer system 200 includes a chassis (1), a side panel (2) for service and/or accessing the modules within the computer system 200, a module (3) (which may include, for example, memory chips and one or more CPUs), a modular bezel (4) (which may include a control panel assembly and a system identifier (ID)), a modular hard disk drive cage (5) (which may include a back plane and one or more hard disk drives), a housing (6) which may include a peripheral component interconnect (PCI) fan and a speaker (e.g., as a module), a modular PCI hold down device (7) which can hold down multiple PCI long and/or short cards, and a support bar (8) for securing installed components within the computer system 200.

In one embodiment of the present invention, the modular bezel may have air passages at various locations (e.g., the sides) to allow airflow. Also, these passages may have filters installed on an end to prevent dust from entering the internal sections of the computer system 200 and/or for acoustic reasons. The filters may be constructed with material such as foam (e.g., made into a meshed gasket) and the like. Additionally, the fans utilized for the computer system 200 may also have such filters installed on either side of the fan to prevent dust from entering the internal sections of the computer system 200. In an embodiment of the present invention, the fan filters may be installed on the side facing outwardly from the computer system 200 to, for example, provide fan noise reduction.

Figure 3:
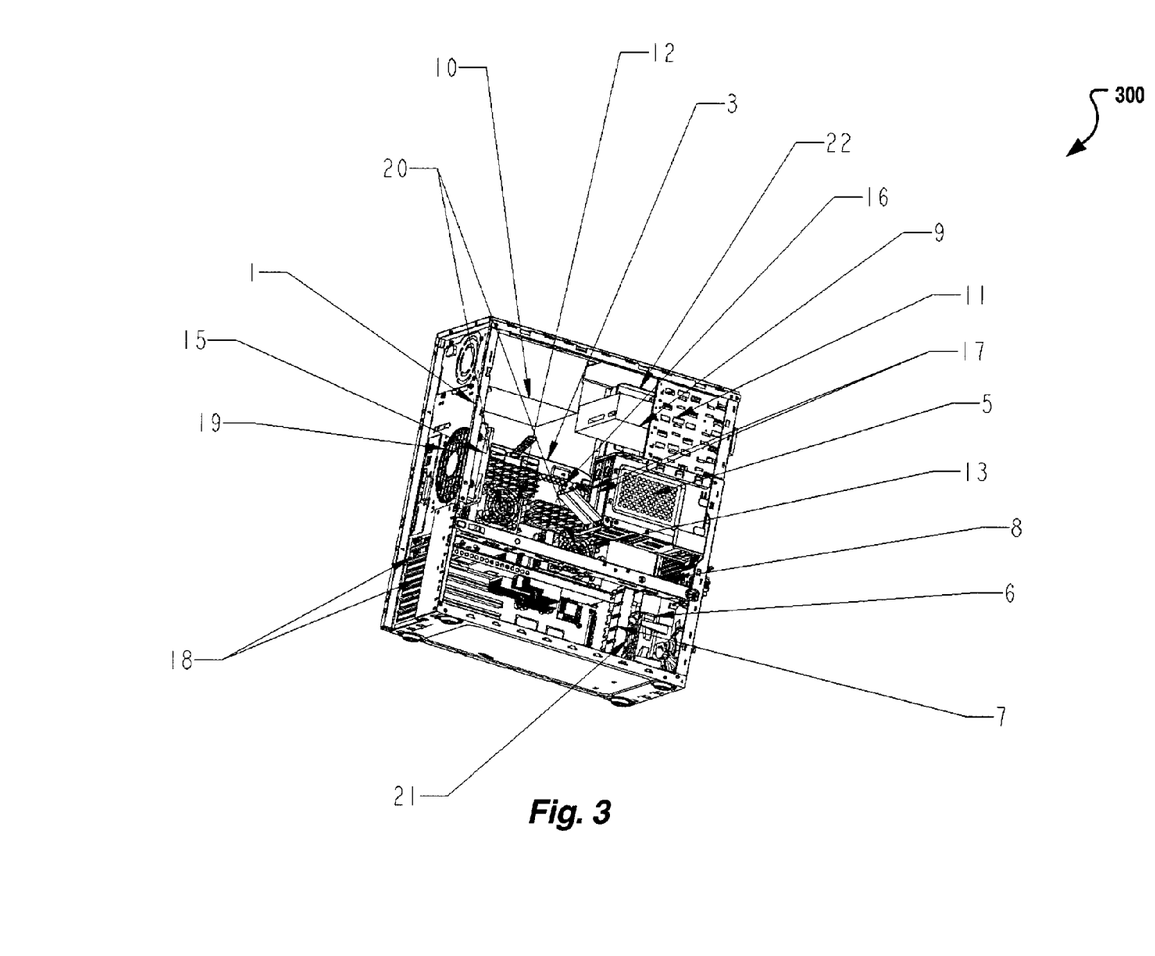
FIG. 3 illustrates an exemplary partial side view of a computer system 300 in accordance with an embodiment of the present invention.

FIG. 3 illustrates an exemplary partial side view of a computer system 300 in accordance with an embodiment of the present invention. In an embodiment of the present invention, the computer system 300 may include the same or similar components to the computer system 200 of FIG. 2. The computer system 300 includes the modular PCI hold down device (7) which can hold down multiple PCI long and/or short cards (18), the modular hard disk drive cage (5) (which may include a back plane and one or more hard disk drives (17)), a motherboard (16) (including, for example, memories chips and one or more CPUs (e.g., 12 and 13 with CPU fans 20), for example, as the module (3)), the modular PCI hold down device (7) which can holds down one or more PCI long & short cards (18), a power supply (10), a system fan (15), and a media bay (11) (for example for 5¼ inch (9) and/or 3½ inch devices, and/or a smart card reader).

In an embodiment of the present invention, the module (3) may be formed on a metal tray (22) to, for example, improve heat dissipation and/or electromagnetic interference (EMI) shielding. The metal tray may be constructed with Aluminum, cold-rolled steel, alloys thereof, and the like. In an embodiment of the present invention, the fans (e.g., 6 and 15) may include openings through which air is forced from the inlet side of the computer system 300 (21) to the outlet side of the computer system 300 (19) (i.e., from the front of the computer system 300 to the rear of the computer system 300). Accordingly, in an embodiment of the present invention, the computer system 300 includes a vent for each fan, which may be arranged adjacent to and aligned with the fan opening (19) at its outlet side. The airflow direction will be further discussed with respect to FIG. 4 below.

Figure 4:
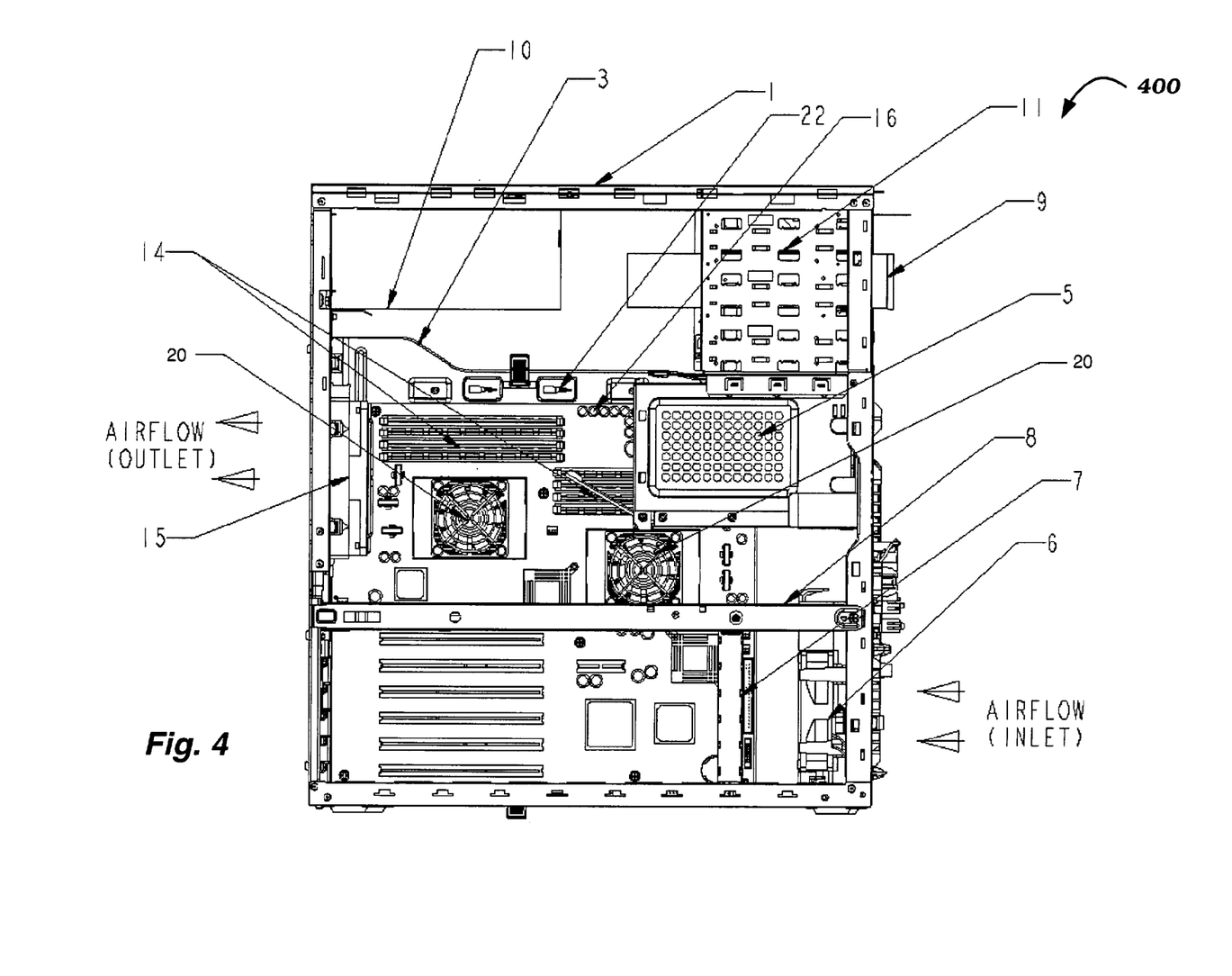
FIG. 4 illustrates an exemplary top view of a computer system 400 in accordance with an embodiment of the present invention.

FIG. 4 illustrates an exemplary top view of a computer system 400 in accordance with an embodiment of the present invention. In an embodiment of the present invention, the computer system 400 may include the same or similar components of one or more of the computer systems 200 and 300 discussed in reference to FIGS. 2 and 3, respectively. The computer system 400 includes the motherboard (16) (having, for example, memories (14) and CPUs (12 & 13) on the metal tray (22) as the module (3). As illustrated in FIG. 4, in one embodiment of the present invention, the computer system 400 receives external air through its PCI fan (6) and extracts the air from the internal section via the system fan (15). The air extracted by the system fan (15) may also include the air from one or more CPUs (e.g., 12 and 13) through the CPU fans (e.g., 20 of FIG. 3). In one embodiment, the CPU fans (20) may be directly mounted on the CPUs (e.g., 12 and 13) or heat sinks (not shown) attached to the CPUs. Accordingly, the cooling fans (e.g., 6, 15, and 20) may be mounted at such locations on the chassis (1) to allow optimization of air circulation and, hence, cooling within the housing and directly mounted localized cooling forming dedicated cooling channels within the housing by an efficient placement of the cooling fans. This embodiment may be useful to effectively cool high power multiprocessors.

In an embodiment, the optimized fan placement (e.g., 6, 15, and 20) within the chassis (1) results in efficient cooling of various system components and allows for increase in system component packing density without a commensurate increase in the number of cooling fans. In one embodiment of the present invention, a relatively smaller PCI fan (6) is utilized to cool the PCI cards area. Each CPU will be cooled with its own cooling fan (20). A relatively larger system fan (15) then extracts the air from the vicinity of the CPU fans (20) and the PCI fan (6) to the outside.

In a further embodiment of the present invention, the computer system (such as 200–400) may be located vertically (i.e., with the motherboard (16) being substantially perpendicular to a horizon) with the power supply (10) facing upwardly. Such an embodiment may insure that the more heat generating components of the computer system (such as 200–400) such as the power supply (10) are relatively higher. Since heat rises, the larger amount of heat may be expunged through the chassis (1) on the side of the power supply (10) instead of through other chip components such as the PCI components or the CPUs (e.g., 12 and 13). Additionally, locating the system fan (15) nearer to the CPUs (e.g., 12 and 13) and memory chips (14) may ensure that the more expensive components of the computer system (e.g., 200, 300, or 400) remain cooler.

Figure 5:
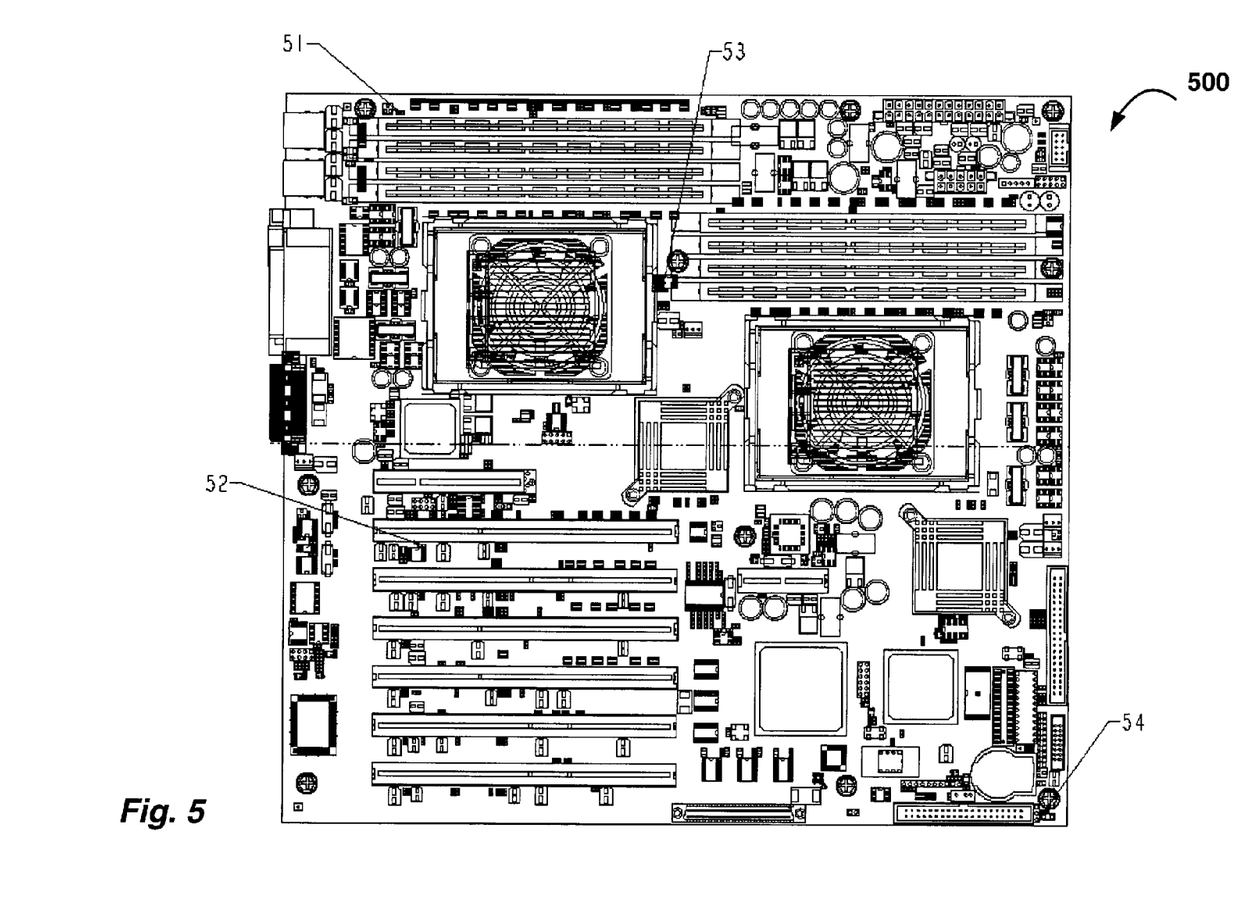
FIG. 5 illustrates an exemplary top view of a motherboard 500 in accordance with an embodiment of the present invention.

FIG. 5 illustrates an exemplary top view of a motherboard 500 in accordance with an embodiment of the present invention. The motherboard 500, in an embodiment of the present invention, may be the same or similar to the motherboard (16) discussed with respect to the previous figures. The motherboard 500 may include one or more thermal diodes (e.g., 51, 52, 53, and 54) located in the vicinity of various components (e.g., CPUs, memories, PCI components, or air inlet locations). The thermal diodes may be semiconductor devices and the like. It is envisioned that other forms of temperature sensors may also be utilized in place of the thermal diodes (51–54) such as bimetallic thermal sensors, any combinations thereof, and the like. The thermal input from the temperature sensors (such as their average, minimum, and/or maximum) may then be utilized, in an embodiment of the present invention, to control the speed of the fans (6, 15, or 20).

Figure 6:
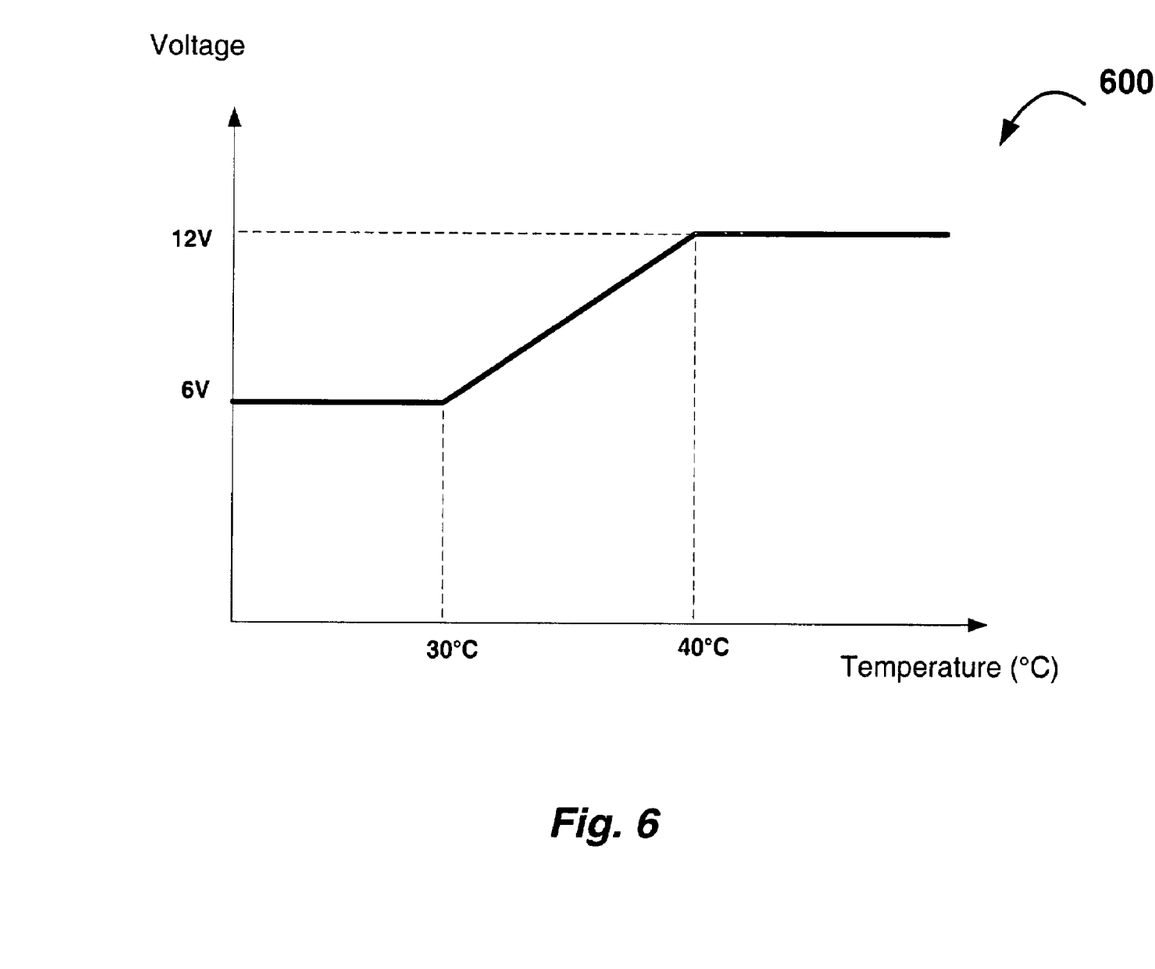
FIG. 6 illustrates an exemplary signal diagram 600 illustrating the voltage supplied to one or more cooling fans versus the temperature.

FIG. 6 illustrates an exemplary signal diagram 600 illustrating the voltage supplied to one or more cooling fans versus the temperature. The signal diagram indicates that for fans (e.g., 6, 15, or 20 discussed with respect to previous figures) operating, for example, between 6V to 12V, the input voltage of the fan (which controls the speed of the fan) may be raised starting at 30° C. Similarly, the diagram 600 indicates that the maximum speed of the fan may be reached by applying 12V at about 40° C. The speed of the fans (or their input voltages) may be adjusted as a function of voltage supplied to them based on the inputs received from one or more temperature sensors discussed with respect to FIG. 5.

In yet another embodiment of the present invention, the fan speeds may be adjusted in accordance with the clock speed of the CPUs. For example, if a CPU that is exiting its suspend mode and becoming active increases its clock speed, the speed of the fans may be adjusted (prior to the temperature sensors sensing increased heat). In further embodiments of the present invention, the thermal sensors may be located in any location of interest such as under the CPUs, implanted in or on top of the printed circuit board (PCB), under or adjacent to the memory chips, the PCI components, and/or junction temperature (e.g., silicon die temperature) of the CPUs.

The foregoing description has been directed to specific embodiments of the present invention. It will be apparent to those with ordinary skill in the art that modifications may be made to the described embodiments of the present invention, with the attainment of all or some of the advantages. For example, the techniques of the present invention may be utilized in set-top boxes, blade computers, electronic gaming apparatus (such as those provided by Microsoft Corporation of Redmond, Wash. (e.g., XBOX game machine), Sony Corporation of Japan (e.g., PlayStation game machine), and the like. Therefore, it is the object of the appended claims to cover all such variations and modifications as come within the spirit and scope of the invention.

What is claimed is:

1. A method comprising:
   providing at least two cooling fans arranged front to back of the computer system to create a push (inlet) and pull (outlet) airflow to cool the computer system;
   providing a first central processing unit (CPU) fan coupled to a first CPU to extract heat generated by the first CPU;
   providing a second CPU fan coupled to a second CPU to extract heat generated by the second CPU;
   providing a first temperature sensor to sense a temperature at the inlet fan and the outlet fan, and to control the speeds of the inlet fan and the outlet fan; and
   providing a second temperature sensor to sense a temperature at the first CPU and the second CPU, and to control the speeds of the first CPU fan and the second CPU fan.

2. The method of claim 1 further including providing a device to hold down one or more printed circuit boards (PCBs).

3. The method of claim 2 further including providing a fan to cool the one or more PCBs.

4. The method of claim 1 wherein the first CPU and the second CPU are adjacent to each other.

5. The method of claim 1 further comprising providing a third temperature sensor to sense a temperature at a memory chip.

6. The method of claim 1 further including increasing the speed of the inlet fan and the outlet fan when a temperature sensed by the first temperature sensors increases.

7. The method of claim 1 further including decreasing the speed of the inlet fan and the outlet fan when a temperature sensed by the first temperature sensor decreases.

8. The method of claim 1 further including providing a power supply and a peripheral component interconnect (PCI) device area located on opposite sides of the first CPU and the second CPU.

9. The method of claim 8 further including locating the inlet fan substantially adjacent to the PCI device area.

10. The method of claim 1 wherein the first and second temperature sensors are selected from a group comprising a thermal diode and bimetallic thermal sensors.

11. A computer system comprising:
    a first central processing unit (CPU);
    a first CPU fan coupled to the first CPU to cool the first CPU;
    a second CPU;

a second CPU fan coupled to the second CPU to cool the second CPU;

an inlet fan located adjacent to a first side of a motherboard holding the CPU, the inlet fan pulling outside air into a computer chassis housing the motherboard;

an outlet fan located adjacent to a second side of the motherboard, the outlet fan being located adjacent to the CPU to push air out of the chassis;

a first temperature sensor to sense a temperature at the inlet fan and the outlet fan, and to control the speeds of the inlet fan and the outlet fan; and a second temperature sensor to sense a temperature at the first CPU and the second CPU, and to control the speeds of the first CPU fan and the second CPU fan.

12. The computer system of claim 11 further including device to hold down one or more printed circuit boards (PCBs).

13. The computer system of claim 11 further including a fan to cool the one or more PCBs.

14. The computer system of claim 11 wherein the first CPU and the second CPU are adjacent to each other.

15. The computer system of claim 14 wherein the first CPU and the second CPU are adjacent to a plurality of memory banks, each memory bank corresponding to one of the plurality of CPUs.

16. The computer system of claim 11 further comprising providing a third temperature sensor to sense a temperature at a.

17. The computer system of claim 11 wherein a maximum speed of one or more of the inlet and outlet fans is reached at a maximum temperature selected from a group comprising a maximum sensed temperature and an average sensed temperature of the plurality of temperature sensors.

18. The computer system of claim 17 wherein the maximum temperature is about 40° C.

19. The computer system of claim 11 wherein a minimum speed of one or more of the inlet and outlet fans is maintained below a minimum temperature selected from a group comprising a minimum sensed temperature and an average sensed temperature of the plurality of temperature sensors.

20. The computer system of claim 19 wherein the minimum temperature is about 30° C.

21. The computer system of claim 11 wherein the first side and the second side are substantially opposite from each other.

22. The computer system of claim 11 further including a power supply and a peripheral component interconnect (PCI) device area located on opposite sides of the CPU.

23. The computer system of claim 11 wherein the inlet fan is in a vicinity of the (PCI) device area.

24. The computer system of claim 11 wherein the first and second of temperature sensors are selected from a group comprising a thermal diode and bimetallic thermal sensors.

25. The computer system of claim 11 wherein the speed of the inlet fan and the outlet fan is increased when a temperature sensed by the first temperature sensors increases.

* * * * *